US012546215B2

(12) United States Patent
Wang et al.

(10) Patent No.: US 12,546,215 B2
(45) Date of Patent: Feb. 10, 2026

(54) FRACKING EFFICIENCY EVALUATION SYSTEM AND METHOD(S) OF USE

(71) Applicant: IFDATA LLC, Houston, TX (US)

(72) Inventors: Wen Wang, Houston, TX (US); Joseph Mjehovich, Denver, CO (US); Ge Jin, Houston, TX (US)

( * ) Notice: Subject to any disclaimer, the term of this patent is extended or adjusted under 35 U.S.C. 154(b) by 0 days.

(21) Appl. No.: 19/194,528

(22) Filed: Apr. 30, 2025

(65) Prior Publication Data

US 2025/0257653 A1 Aug. 14, 2025

Related U.S. Application Data

(63) Continuation-in-part of application No. 18/408,057, filed on Jan. 9, 2024, now Pat. No. 12,312,927.

(51) Int. Cl.

| | |
|---|---|
| ***E21B 49/00*** | (2006.01) |
| ***E21B 43/26*** | (2006.01) |
| ***G01V 20/00*** | (2024.01) |

(52) U.S. Cl.

CPC .............. *E21B 49/00* (2013.01); *E21B 43/26* (2013.01); *G01V 20/00* (2024.01)

(58) Field of Classification Search

CPC ...... E21B 43/26; E21B 49/00; E21B 2200/20; E21B 49/006

See application file for complete search history.

(56) References Cited

U.S. PATENT DOCUMENTS

| | | | | |
|---|---|---|---|---|
| 10,287,874 | B2 * | 5/2019 | Jin | E21B 47/113 |
| 11,286,773 | B2 | 3/2022 | Jin et al. | |
| 2023/0009947 | A1 | 1/2023 | Ruhle et al. | |

FOREIGN PATENT DOCUMENTS

| | | |
|---|---|---|
| CA | 3150258 | 9/2023 |
| CN | 116882118 | 10/2023 |

* cited by examiner

*Primary Examiner* — Zakiya W Bates

(74) *Attorney, Agent, or Firm* — Leyendecker & Lemire, LLC

(57) ABSTRACT

An improved fracking efficiency evaluation system and method of the system can be implemented to generate a completion design plan based on quantitative analysis of fracture geometries including observed and unobserved fractures in a treatment well. One or more metrics based on a statistical distribution of fracture geometries of an entire treatment well including each stage can be used to generate a completion design plan for optimizing performance of a treatment well.

25 Claims, 3 Drawing Sheets

FRACKING EFFICIENCY EVALUATION SYSTEM AND METHOD(S) OF USE

CROSS-REFERENCE TO RELATED APPLICATION

This application is a continuation-in-part of U.S. application Ser. No. 18/408,057, filed Jan. 9, 2024.

BACKGROUND

The implementation of effective completion design configurations during hydraulic fracturing stimulation is crucial for the economic development of unconventional wells. The most successful completion design programs prioritize strategic well placement and optimize design parameters to assert control on fluid and proppant delivery, enabling uniform fracture placement and ultimate resource access. However, understanding the key drivers behind the artificially induced fracture network remains a challenge due to the interdependence of subsurface complexities, completion design variations, and well engineering. Considering that well completion is often the most prohibitive cost to operators, the continued development of advanced monitoring techniques remains a priority.

Distributed fiber-optic sensing (DFOS) is a class of sensing techniques that has become available within the last decade for monitoring the completion and production of unconventional wells. DFOS effectively turns a length of fiber-optic cable into a linear network of sensors that are sensitive to mechanical strain, vibration, and temperature variations along the length of a wellbore.

Fiber-optic cables installed in an offset monitoring well can enable the acquisition of distributed strain measurements associated with the propagation of hydraulic fractures imparted by a nearby injection well. Distributed strain sensing (e.g., low-frequency distributed acoustic sensing, or LF-DAS) based cross-well monitoring provides critical information constraining key principles on fracture density, height, length, and orientation. However, many of the field-based LF-DAS applications have been restricted to qualitative analysis, limiting the use of cross-well strain measurements for hydraulic fracturing diagnostics.

Cross-well based distributed strain measurements have more potential to characterize fracture geometry quantitatively. Recent studies have successfully employed a geomechanical inversion algorithm to calculate fracture width, facilitating a more detailed estimation of overall fracture geometry. Despite these advancements, a method for interpretation that relates fracture geometry to hydraulic fracturing efficiency is not well understood and has not yet been developed. To enhance the effectiveness of distributed cross-well strain measurements, it is critical to develop more rigorous, quantitative analysis and interpretation techniques. This shift is crucial for advancing the technology beyond the current constraints of qualitative analysis, creating a more comprehensive diagnostic tool for evaluating hydraulic fracturing designs.

DETAILED DESCRIPTION

Figure 1A:
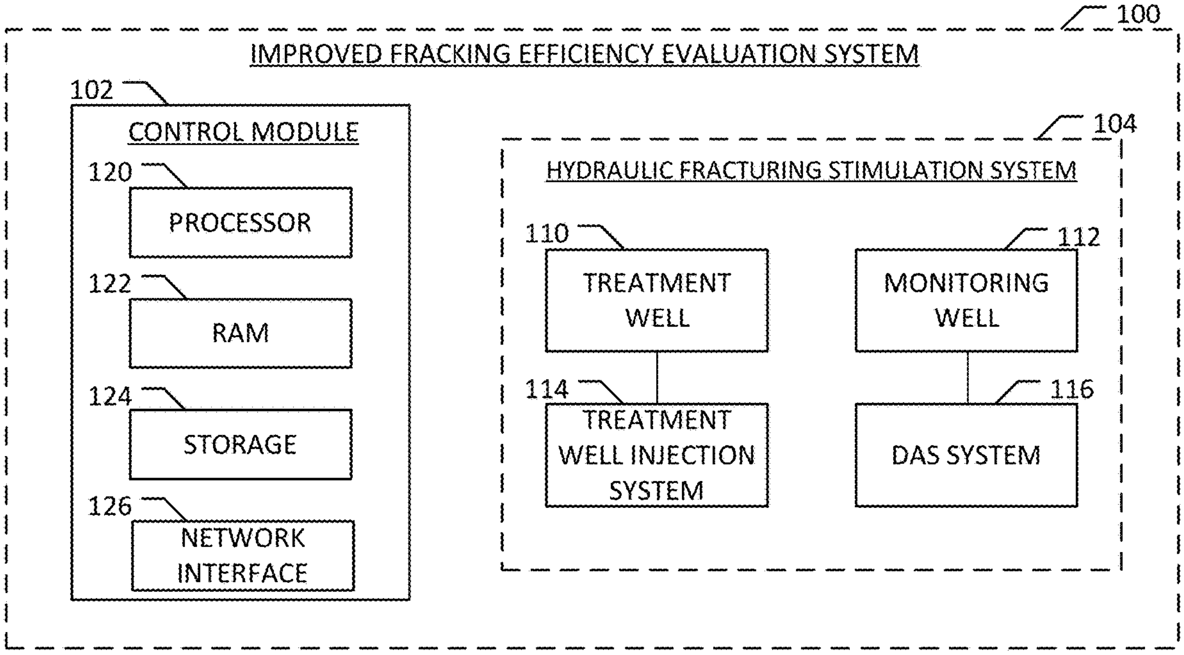
FIG. 1A is a block diagram of a fracking efficiency evaluation system according to one embodiment of the present invention.

Embodiments of the present invention include an improved fracking efficiency evaluation system and method(s) of use thereof. For instance, a novel method for evaluating the efficiency of hydraulic fracturing completion designs is contemplated. The novel method can utilize cross-well strain measurements to calculate a width and a height of hydraulic fractures using an inversion algorithm to later be incorporated into a novel statistical model. The novel model can implement one or more statistical inversion methods (e.g., Bayesian inference and Monte Carlo simulation) to produce a distribution of possible fracture geometries and their associated probabilities. Additionally, the novel model can account for the geometry of fractures that do not extend to (or are not detected at) the monitoring well. Of note, by utilizing the distribution of fracture geometries, several different metrics can be determined. For instance, the metrics can include, but are not limited to, predicting production levels associated with different completion designs, evaluating completion design efficiency based on the induced fracture geometry, and the actual fracture surface area compared to the optimal fracture surface area generated by different completion designs. Embodiments of the novel method enable an estimation of the total fracture geometry including, but not limited to, width, length, and height at any point along a fracture. As can be appreciated, the novel method can be comprehensive by offering a more detailed and accurate representation of one or more fractures initiated from a completion well, enhancing an ability to provide design recommendation metrics.

Embodiments of the method can be directly applied to optimize hydraulic fracturing designs by providing detailed insights into fracture geometries and their implications on production. Of note, by integrating statistical model outputs with production prediction methods, operators can achieve more accurate production forecasts, improving budget planning and resource allocation.

Improvements and benefits of the present method and system can include, but are not limited to, improved accuracy, comprehensive fracture evaluation, an economic efficiency parameter, a fracture width constraint, a fracture height constraint, statistical modeling, an ability to account for an entire fracture network (e.g., every intended fracture in the completion well), and production metrics to support economic decision-making suggestions.

Improved accuracy can be achieved by a direct calculation of fracture width and fracture height from distributed strain data that can help ensure more accurate and reliable inputs for the statistical model. As can be appreciated, this can lead to more comprehensive and precise estimates of fracture geometries. A comprehensive evaluation can be achieved by accounting for fractures that do not extend to (or are detected by) the monitoring well. The method can be implemented to provide a near complete picture of a hydraulic fracture network thus reducing uncertainty in the evaluation process. An economic efficiency parameter can be determined and be implemented to evaluate completion designs and associated production likelihoods. The economic efficiency parameter can help operators identify the most cost-effective development strategies. A calculated width of hydraulic fractures can be implemented as a constraint for the statistical model. Of note, fracture width can be directly calculated from the cross-well strain data using an inversion algorithm, and this calculated width can then be used as an input in the statistical model. The inversion algorithm can provide an estimate for fracture heights. The estimated fracture height can be an "average fracture height" for all hydraulic fractures in a treatment stage. Combined with additional information on fracture geometry and shape, the height estimate further constrains the statistical model. Advanced statistical models including, but not limited to, Bayesian inference and Monte Carlo simulation can be implemented to produce a distribution of possible fracture geometries and their associated probabilities. The detailed statistical analysis can help determine the most likely fracture geometries.

The method can address disparities between the number of perforation clusters at a treatment well and fracture hits observed at the monitoring well. Of note, methods such as Monte Carlo simulation can be used to manage the uncertainty and variability in the data, particularly associated with fractures that do not intercept the monitoring well. This approach can help ensure all potential fractures are accounted for, even those unobserved at the monitoring well.

Production likelihood and economic evaluation parameters can be generated from the data of the statistical model. For instance, production likelihoods can be generated using the outputs from the statistical model based on different completion designs that were implemented in the completion well. Further, by integrating the outputs from the statistical model with established methods that relate fracture geometry to production (e.g., Rate Transient Analysis, Perkins-Kern-Nordgren, or hydraulic fracture modeling software), production predictions can be better constrained and refined. As can be appreciated, this can provide an economic evaluation of different completion designs related to production.

A method for evaluating a completed treatment well and providing design recommendations based on the cross-well distributed strain data can include, but is not limited to, the steps of: (i) identifying frac-hits in strain data; (ii) correlating frac-hits with perforation clusters; (iii) calculating one or more standard metrics; (iv) calculating frac width(s) and frac height(s) for each frac-hit; (v) statistical model inversion using calculated frac widths, frac heights, and frac lengths; (vi) generating a statistical distribution of frac geometry; (vii) generating a completion efficiency for each stage via fracture geometries of each perforation cluster with uncertainty; (viii) comparing a frac surface area ratio (against optimized frac surface area); (ix) generating a completion efficiency for each stage via production rate and volume; (x) providing one or more design recommendations; and (xi) implementing the one or more design recommendations in a future well completion operation.

Described hereinafter is one example implementation of the method for evaluating a completed treatment well and generating recommendations for well completion of a future well. Of note, one or more steps may be altered without exceeding a scope of the present invention.

In a first step, fracture hits intended by a treatment well can be identified in the distributed strain data collected from a monitoring well. The data can be analyzed to detect strain signals that indicate the interaction of fractures with a fiber-optic cable in the monitoring well. These distinct strain patterns are known as "frac-hits". To identify the frac-hits, time-series data can be analyzed to pinpoint an exact time and location of each event. This can allow for the correlation of fracture events with specific perforation clusters in the treatment well.

In a second step, once the frac-hits have been identified in the strain data, the frac-hits can be mapped to their corresponding perforation clusters in the treatment well. Typically, planar fracture growth can be assumed, where fractures grow semi-parallel (or quasi parallel) to each other. The distributed strain data can be utilized to establish a connection between the detected frac-hits and their originating perforation clusters. By analyzing the time and location of the frac-hits in relation to the known positions of the perforation clusters, each fracture can be accurately traced back to a source of the fracture (a perf cluster). Further, fractures can be categorized as being either observed or unobserved. Observed fractures can be those fractures that reach or surpass the monitoring well. Unobserved fractures can be those fractures that do not reach the monitoring well. In one instance, the unobserved fractures can be determined in each stage of a treatment well based on an absence of detectable strain responses in the distributed strain data. In another instance, unobserved fractures can be determined in each stage of the treatment well by comparing the number of clusters in each stage of the treatment well to the number of observed fractures identified from the distributed strain data, where a difference between the two can indicate the number of unobserved fractures, assuming a good hydraulic fracture program that can stimulate all the perf clusters in the treatment stage.

In a third step, one or more standard metrics can be calculated to characterize the previously completed hydraulic fracturing process. The standard metrics can include, but are not limited to, propagation velocity, treatment volume to frac-hit, frac efficiency, and frac azimuth. Propagation velocity can measure how quickly fractures propagate through the formation. Treatment volume to frac-hit can quantify the total injection fluid volume required for a fracture to reach the monitoring well. Frac efficiency is calculated as the ratio of the number of fracture hits observed at the monitoring well to the number of perforation clusters in the treatment well. Frac azimuth can determine the directional orientation of the fractures.

In a fourth step, an inversion algorithm can be implemented to assess fracture dimensions. The inversion algorithm can utilize key inputs from the calculated data of the previous step. Primary inputs for the inversion algorithm can include, but are not limited to, the measured distributed strain data including time and location information of the identified frac-hits. For instance, inputs can include measured distributed strain data from each stage along with time and location of the frac-hits. Outputs of the inversion algorithm can include time-dependent fracture widths and an estimate of fracture heights. Of note, by processing the distributed strain data and frac-hit information, the method can provide information on fracture geometry metrics (e.g., fracture width, fracture length, and fracture height). These generated outputs can be implemented in further steps. Of note, the frac-length may be an estimated frac-length based on various factors. Observed fractures that reach the monitoring well can have a length at least as long as a distance between the treatment well and monitoring well. However, the observed fractures can continue to grow beyond the monitoring well. To estimate how long these fractures actually are, various methods can be implemented. For example, information from the standard metrics including how fast the fractures are growing (e.g., propagation velocity) and how long the injection lasts can be used to estimate the actual fracture lengths. As can be appreciated these can help determine an estimation of the fracture lengths for the observed fractures.

Of note, measuring the fracture geometry at a monitoring well alone can provide a broad understanding of how fractures are developing and whether they are reaching a target zone. This information can be useful for higher-level assessments, such as determining how many fractures are reaching the monitoring well (i.e., observed fractures) and when they arrive. However, while this information provides a broad overview, it does require a greater reliance on assumptions about the rest of the fracture network (i.e., unobserved fractures) to make any additional, more detailed analysis. As such, the described method can implement a more comprehensive analysis of the distributed strain data to provide a more in-depth understanding of fractures imparted by a treatment well.

In a fifth step, a statistical inversion process can be implemented to generate a statistical distribution of fracture geometry (SDFG). As will be described hereinafter, unknown fracture geometries of unobserved fractures can be estimated by integrating observed data with probabilistic models. In some instances, techniques like Bayesian Inference and Monte Carlo simulations can be employed to generate a statistical distribution of potential fracture geometry along with their associated probabilities and likelihood. As can be appreciated, a variety of different statistical methods can be implemented during this step without exceeding a scope of the present invention.

Inputs for the statistical model inversion can include, but are not limited to, observed data and a statistical model. From the observed data, calculated or estimated values such as fracture width, height, and length can be derived, along with injection parameters (e.g., fluid volume) and standard metrics (e.g., propagation velocity). These known data sets can serve as constraints within the inversion process. The statistical model can be a chosen probability distribution (e.g., Gaussian, Log-normal, etc.) that may represent an expected variability in fracture geometry. The statistical model may be based on prior knowledge or reasonable assumptions associated with fracture geometry.

Statistical inversion can be implemented to combine the data (e.g., the observed measurements) with the statistical model. The statistical inversion can provide estimates for unknown fracture parameters by fitting the statistical model to known data (e.g., frac height, frac width, injection parameters, and standard metrics). An output of the statistical inversion can be a statistical distribution of fracture geometry, presenting a range of possible fracture geometries along with their probabilities. These can include distributions of fracture lengths, with each length associated with corresponding fracture width and height, providing a comprehensive view of the fracture geometry.

In a sixth step, outputs from the statistical inversion process can be analyzed to derive fracture geometry estimates. A primary outcome of the previous step can be the statistical distribution of fracture geometry, which can reflect a range of possible fracture lengths, fracture heights, and fracture widths and allows for a detailed assessment of uncertainty and variability. Utilizing the distribution, a "maximum likelihood" estimate can be determined. The maximum likelihood can represent a most probable fracture length, along with associated fracture width and height, based on one or more inputs (e.g., observed data and statistical model). The estimate can provide crucial information for subsequent modeling and decision-making.

In one instance, the method can implement one or more Monte Carlo methods. The Monte Carlo method(s) can help generate a "sample" of the distribution (generally many times), identifying fracture geometries that align with the observed data, and estimating geometries of fractures that may not be well constrained (e.g., fractures that do not reach the monitoring well). The one or more Monte Carlo methods can be applied across all stages and perforation clusters, resulting in a statistical model that represents fracture geometries across the entire well. In one instance, the method can assume that all fractures are considered to have the same shape (e.g., rectangular, elliptical, etc.), ensuring consistency across the model. Uncertainty of fracture length estimates can be determined by the one or more Monte Carlo methods. As can be appreciated, this may be an integral component of the analysis, as it can highlight the confidence levels associated with generated results.

Of note, the system can include a process for estimating a geometry (e.g., length, width, and height) of fractures that do not reach the monitoring well, referred to as "unobserved" fractures. Data from fractures that do reach the monitoring well, referred to as "observed" fractures, can be implemented to constrain a model and make informed estimates about the unobserved fractures. As can be appreciated, by leveraging the statistical model, the measured fracture geometries (e.g., length, width, and height) from observed fractures can be incorporated along with the injection parameters (e.g., fluid volume) to infer a likely geometry of the unobserved fractures. This can allow for an account of the entire fracture network, even in the absence of direct measurements, by using the observed data at the monitoring well. More succinctly, known and calculated properties of observed fractures can be implemented to statistically estimate information (i.e., geometry) about the unobserved fractures.

In a seventh step, a completion design efficiency can be evaluated based on a generated fracture surface area during treatment stages. Of note, a fundamental assumption can be implemented that greater surface area contact between fractures and reservoir leads to increased hydrocarbon production.

To define an optimum frac surface area, a fracture shape can be assumed (e.g., rectangular, elliptical) and used as a basis for estimating fracture geometry parameters, including width, length, and height. The fracture geometry parameters can be estimated from the data (e.g., observed fractures) as well that all clusters at the treatment well initiate a fracture that grows within this assumed fracture geometry. The estimated optimum fracture geometry parameters can be constrained by the treatment fluid volume. For example, an assumption can be made that the total injection fluid is evenly distributed across all fractures, constraining the estimated optimum fracture geometry.

To define an actual frac surface area, an actual fracture geometry can be evaluated. An assumption can be made that actual fracture geometry has the same fracture shape (e.g., rectangular, elliptical, etc.) as for the optimum surface area. An estimation can be made for the most probable fracture dimensions from the statistical distribution of frac geometry and Monte Carlo sampling results. As can be appreciated, this can provide an estimate of fracture surface area for each of the fractures, including the unobserved fractures.

Once the optimum frac surface area and the actual frac surface area have been determined, a ratio of actual to optimum frac surface area can be calculated to generate a percentage value which can be used to compare and evaluate design performance.

In an eighth step, a completion efficiency metric can be calculated based on production rate and volume. A prediction of production rates and volumes can be analyzed by leveraging both optimum and actual fracture geometries. An estimate can be implemented from the data (e.g., observed fractures) and injection parameters (e.g., injection volume) to predict production rates based on an optimum fracture geometry. Concurrently, production rates can be calculated using the actual fracture geometry derived from the statistical distribution of fracture geometry (e.g., maximum likelihood). This can enable a comparison between the predicted values for optimum and actual production rates.

To achieve this, a production prediction model (analytical or numerical) can be employed, with fracture geometry as a required input. A resulting output can be a comparison of the predicted production rates. A first one based on the optimum fracture geometry and a second one based on the actual geometry. A difference between these two rates can offer a quantifiable metric for evaluating the efficiency of a completion design, providing an economic assessment of how well the design translates to production output. As can be appreciated, this metric can be utilized for assessing the performance of different completion strategies and optimizing future hydraulic fracturing operations. By linking fracture geometry directly to production rates, a clear economic perspective can be provided on the effectiveness of the completion design.

In a ninth step, one or more efficiency metrics can be calculated for each treatment stage based on the estimated fracture geometries from the preceding statistical analysis. The one or more efficiency metrics can serve as a quantitative indicator of fracture performance for each stage. Of note, by grouping stages according to their design types, the efficiency metric can be calculated and compared across different designs, enabling a direct evaluation of design efficiency via fracture geometry. The final output can be an efficiency metric that provides a quantifiable basis for assessing and optimizing future completion designs. Of note, the metric described in step nine can implement the direct results (or outputs) from the statistical distribution of fracture geometries without requiring additional assumptions. In contrast, the metrics from steps seven and eight can generally make further assumptions and take a notable additional step to produce a result.

One example can be a uniformity index, which can be generated using direct results from the statistical distribution of fracture geometries. The uniformity index metric can quantify a consistency of fracture geometries, such as length, height, and width across all stages and design types implemented in the treatment well. As can be appreciated, a higher uniformity index may indicate that fractures are being generated in a predictable and consistent manner, suggesting that key design parameters including, but not limited to, fluid volume, pressure, and cluster spacing are being applied effectively. For instance, a stage or design with a high uniformity index can demonstrate that fractures geometries in that stage or having that design are developing consistently and as planned. Generally, a higher index can correlate with improved production outcomes and better fracturing design. Of note, the uniformity index can be one example of a metric implemented to utilize the results from the statistical distribution of fracture geometries to help evaluate and calculate a uniformity, evenness, etc. of fractures in a treatment well.

Of significant note, the metric implements the estimated geometries of every intended fracture—both observed and unobserved—derived from the statistical distribution of fracture geometries. By implementing every intended fracture, the method enables a more comprehensive characterization of the fracture network, allowing the metric to be applied in a meaningful and reliable way. The metric can provide users with a fast, practical tool to evaluate and compare completion designs.

Of significant note, the standard distribution of fracture geometries can be implemented to determine a likely geometry of a fracture at any point along the fracture to aid in optimizing fracture treatment designs. During hydraulic fracturing, fluid pressure and injection rates are designed to achieve a desired fracture propagation. As can be appreciated, knowing the geometry (width, height, and length) at various points along the fracture helps to optimize the treatment fluid volume and pressure required to develop and maintain fractures throughout the reservoir. The comprehensive geometry information generated can help operators tune their injection parameters and avoid unnecessary fluid and proppant usage, reducing cost and mitigating the risk of under-stimulating parts of the reservoir or wasting material resources on over-stimulating.

In a tenth step, a design recommendation can be provided based on the analysis of one or more of (i) completion efficiency via frac geometry with uncertainty, (ii) fracture surface area ratios, and (iii) completion efficiency via production rate and volume. Of note, one or more parameters (or metrics) can be determined for each analysis of (i) completion efficiency via frac geometry with uncertainty, (ii) fracture surface area ratios, and (iii) completion efficiency via production rate and volume. These parameters can be implemented to help generate the design recommendations.

In an eleventh step, one or more design option parameters can be implemented for at least one stage of the future treatment well based on the completion design plan. Of note, since the metrics can be applied on a stage-by-stage basis, the completion design plan may provide a design option parameter for a specific type of stage, a design option parameter for a group of stages, and/or a design option parameter for every stage.

In one embodiment, a method to evaluate every intended fracture created in a multi-stage, multi-cluster hydraulic fracturing treatment well (TW) during fracturing treatments of the TW can include, but is not limited to, the following steps: (i) obtaining a calculated fracture geometry for each observed fracture, each of the calculated fracture geometries based on at least distributed strain data acquired at a monitoring well during fracturing treatments of the TW; (ii) determining unobserved fractures in each stage of the TW based on the distributed strain data; (iii) using the calculated fracture geometries, at least one statistical model, and one or more injection parameters as inputs for a statistical inversion algorithm; (iv) generating a statistical distribution of fracture geometries including every intended fracture from the statistical inversion algorithm; (v) updating the statistical inversion algorithm from each successive stage of the TW to further refine the statistical distribution of fracture geometries to estimate a fracture geometry for each unobserved fracture; (vi) generating at least one performance metric based on the statistical distribution of fracture geometries; (vii) providing one or more hydraulic fracturing design recommendations in a completion design plan based on the at least one metric; and (viii) implementing at least one of the one or more hydraulic fracturing design recommendations in a future treatment well.

In another embodiment, a method to evaluate every intended fracture created in a multi-stage, multi-cluster hydraulic fracturing treatment well (TW) during fracturing treatments of the TW can include, but is not limited to, the steps of: (i) obtaining a calculated fracture geometry for each observed fracture, each of the calculated fracture geometries based on at least distributed strain data acquired at a monitoring well during fracturing treatments of the TW; (ii) determining unobserved fractures in each stage of the TW based on the distributed strain data, every intended fracture including observed fractures and unobserved fractures; (iii) using (a) the calculated fracture geometries for cach observed fracture, (b) at least one statistical model, and (c) one or more injection parameters as inputs for a statistical inversion algorithm; (iv) generating a statistical distribution of fracture geometries including every observed fracture from the statistical inversion algorithm; (v) using the statistical inversion algorithm to further refine the statistical distribution of fracture geometries to estimate a fracture geometry for each unobserved fracture; (vi) using the estimated fracture geometries for each unobserved fracture to further refine the statistical distribution of fracture geometries; (vii) generating a first predicted production rate, the first predicted production rate based on an actual fracture geometry of every intended fracture; (viii) generating a second predicted production rate, the second predicted production rate based on an optimum fracture geometry of every intended fracture; (ix) generating a first performance metric based on (a) the first predicted production rate and (b) the second predicted production rate; (x) providing one or more hydraulic fracturing design recommendations in a completion design plan based on the first performance metric; and (xi) implementing at least one of the one or more hydraulic fracturing design recommendations in a future treatment well.

In yet another embodiment, a method to evaluate every intended fracture created in a multi-stage, multi-cluster hydraulic fracturing treatment well (TW) during fracturing treatments of the TW can include, but is not limited to, the steps of: (i) obtaining a calculated fracture geometry for each observed fracture, each of the calculated fracture geometries based on distributed strain data acquired at a monitoring well during fracturing treatments of the TW; (ii) determining unobserved fractures in each stage of the TW based on the distributed strain data, every intended fracture including observed fractures and unobserved fractures; (iii) using (a) the calculated fracture geometries for each observed fracture, (b) at least one statistical model, and (c) one or more injection parameters as inputs for a statistical inversion algorithm; (iv) generating a statistical distribution of fracture geometries including every observed fracture from the statistical inversion algorithm; (v) using the statistical inversion algorithm to further refine the statistical distribution of fracture geometries to estimate a fracture geometry for each unobserved fracture; (vi) using the estimated fracture geometries for each unobserved fracture to further refine the statistical distribution of fracture geometries; (vii) determining an optimum fracture surface area based on (a) the observed data, (b) each intended fracture having the same shape, (c) all perforation clusters at the treatment well initiate a fracture, and (d) being constrained by injection parameters; (vii) determining an actual fracture surface area based on (a) most probable fracture geometry parameters derived from the statistical distribution of fracture geometries, and (b) each intended fracture having the same shape as the optimum fracture geometry; (viii) generating a first performance metric based on (a) the optimum fracture surface area and (b) the actual fracture surface area; (ix) providing one or more hydraulic fracturing design recommendations in a completion design plan based on the first performance metric; and (x) implementing at least one of the one or more hydraulic fracturing design recommendations in a future treatment well.

In an embodiment, a method to evaluate every intended fracture created in a multi-stage, multi-cluster hydraulic fracturing treatment well (TW) during fracturing treatments of the TW can include, but is not limited to, the steps of: (i) obtaining a calculated fracture geometry for each observed fracture, each of the calculated fracture geometries based on at least distributed strain data acquired at a monitoring well during fracturing treatments of the TW; (ii) determining unobserved fractures in each stage of the TW based on the distributed strain data; (iii) using the calculated fracture geometries, at least one statistical model, and one or more injection parameters as inputs for a statistical inversion algorithm; (iv) generating a statistical distribution of fracture geometries including every intended fracture from the statistical inversion algorithm; (v) updating the statistical inversion algorithm from each successive stage of the TW to further refine the statistical distribution of fracture geometries to estimate a fracture geometry for each unobserved fracture; (vi) determining a measurable metric for each stage of the TW based on the estimated fracture geometries; (vii) grouping stages of the TW based on a design type of the stages; (viii) comparing the efficiency metric for each different design type; (ix) providing one or more hydraulic fracturing design recommendations in a completion design plan based on the comparison of the efficiency metrics; and (x) implementing at least one of the one or more hydraulic fracturing design recommendations in a future treatment well.

The present invention can be embodied as devices, systems, methods, and/or computer program products. Accordingly, the present invention can be embodied in hardware and/or in software (including firmware, resident software, micro-code, etc.). Furthermore, the present invention can take the form of a computer program product on a computer-usable or computer-readable storage medium having computer-usable or computer-readable program code embodied in the medium for use by or in connection with an instruction execution system. In one embodiment, the present invention can be embodied as non-transitory computer-readable media. In the context of this document, a computer-usable or computer-readable medium can include, but is not limited to, any medium that can contain, store, communicate, propagate, or transport the program for use by or in connection with the instruction execution system, apparatus, or device.

The computer-usable or computer-readable medium can be, but is not limited to, an electronic, magnetic, optical, electromagnetic, infrared, or semiconductor system, apparatus, device, or propagation medium.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

The term "software," as used in this specification and the appended claims, refers to programs, procedures, rules, instructions, and any associated documentation pertaining to the operation of a system.

The term "firmware," as used in this specification and the appended claims, refers to computer programs, procedures, rules, instructions, and any associated documentation contained permanently in a hardware device and can also be flashware.

The term "hardware," as used in this specification and the appended claims, refers to the physical, electrical, and mechanical parts of a system.

The terms "computer-usable medium" or "computer-readable medium," as used in this specification and the appended claims, refers to any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

The term "signal," as used in this specification and the appended claims, refers to a signal that has one or more of its characteristics set or changed in such a manner as to encode information in the signal. It is to be appreciated that wireless means of sending signals can be implemented including, but not limited to, Bluetooth, Wi-Fi, acoustic, RF, infrared and other wireless means.

An Embodiment of an Improved Fracking Efficiency Evaluation System

Referring to FIG. 1A, a block diagram of an embodiment 100 of an improved fracking efficiency evaluation (IFEE) system is illustrated. The IFEE system 100 can be implemented to provide a completion design plan for a treatment well based on evaluating data from one or more previously completed treatment wells.

As shown in FIG. 1, the IFEE system 100 can include, but is not limited to, a control module 102 and a hydraulic fracturing stimulation (HFS) system 104. The control module 102 can be implemented to receive data from the HFS system 104 and determine one or more recommendations for cluster spacing, perforation design, stage length, proppant concentration, proppant size, fracking fluid volume, well spacing, and economic considerations for each stage of a future treatment well based on analyzing the received data. Typically, the recommendations can be included in a completion design plan for the future treatment well. In some instances, the recommendations can be provided in near real-time to allow for adjustments to a new stage of a treatment well currently being treated.

The HFS system 104 can include, but is not limited to, a treatment well 110, a monitoring well 112, a treatment well injection system 114, and a distributed acoustic sensing (DAS) system 116. In some instances, the treatment well injection system 114 can include injection equipment that may be altered based on data of a previous stage analyzed by the control module 102. Generally, the monitoring well 112 can include the DAS system 116 for detecting fractures from the treatment well 110. The DAS system 116 can provide distributed strain data to the control module 102. In one example, the DAS system 116 can be a low-frequency distributed acoustic sensing (LF-DAS) system. It is to be appreciated that other means for obtaining distributed strain data are contemplated and not outside a scope of the present disclosure.

The treatment well injection system 114 can typically include an injection control module and injection equipment for fracturing each stage of the treatment well 110. The injection control module may communicate with the injection equipment and the control module 102. It is to be appreciated that the treatment well injection system 114 may include additional and/or different features for implementing perforation cluster spacing and stage length control. A treatment plan for the treatment well 110 may specify initial parameters for the treatment fluid to be injected into treatment well 110 for each stage. The treatment plan may include stage lengths and a number of perforation clusters for each stage of the treatment well 110. These parameters may be updated after analyzing data from the monitoring well 112 in near real-time or in a future treatment well.

The control module 102 can generally include a processor 120, random access memory 122, a nonvolatile storage (or memory) 124, and a network interface 126. The processor 120 can be a single microprocessor, multi-core processor, or a group of processors. The random-access memory 122 can store executable code as well as data that may be immediately accessible to the processor 120, while the nonvolatile storage 124 can store executable code and data in a persistent state. The network interface 126 can include hardwired and wireless interfaces through which the control module 102 can communicate with other devices and/or networks. In some embodiments, more than one control module 102 can be implemented. The control module 102 can be configured to perform one or more steps of the methods described hereinafter.

Typically, the control module 102 can be any type of computing device including, but not limited to, a personal computer, a server, a programmable logic controller, a game console, a smartphone, a tablet, a netbook computer, or other computing devices. In one embodiment, the control module 102 can be a distributed system wherein computing functions are distributed over several computers connected to a network. The control module 102 can typically have a hardware platform and software components.

Figure 1B:
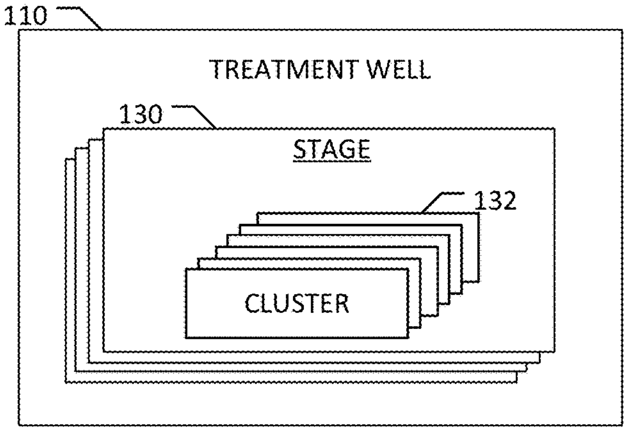
FIG. 1B is a block diagram of a treatment well according to one embodiment of the present invention.

Referring to FIG. 1B, a block diagram of the treatment well 110 is shown. In general, the treatment well 110 can include a plurality of stages 130 that each include a plurality of clusters 132. The plurality of clusters 132 can include perforations allowing for fracking fluid to engage a surrounding area.

Figure 1C:
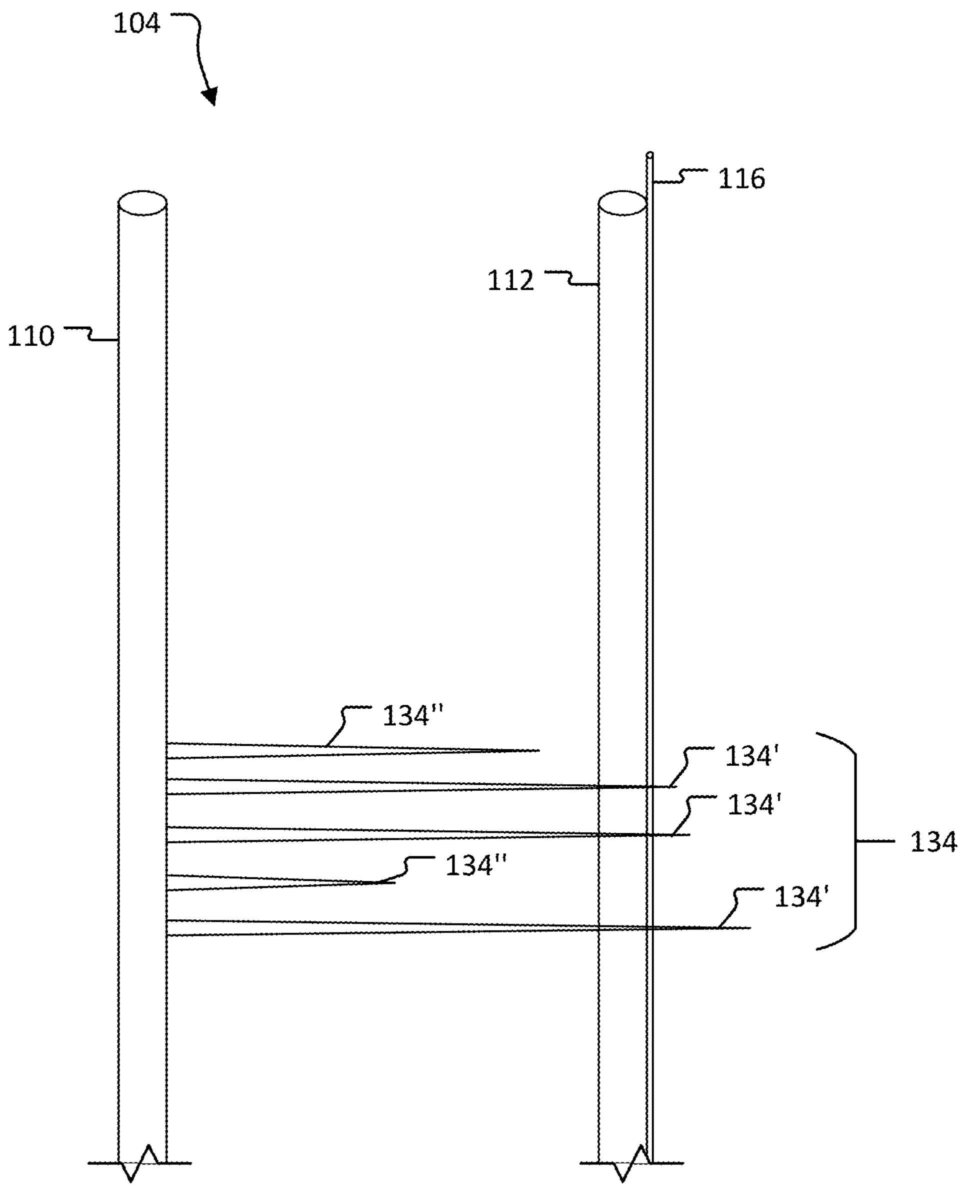
FIG. 1C is a block diagram of a treatment well according to one embodiment of the present invention.

Referring to FIG. 1C, a diagram of an example hydraulic fracturing stimulation system 104 is shown. Of note, the diagram is for illustrative purposes only and not meant to be limiting. As shown, the treatment well 110 and monitoring well 112 can be located a distance from one another. The DAS system 116 can be located proximate or inside the monitoring well 112. As shown, a plurality of fractures 134 formed from a plurality of clusters in the treatment well 110 can extend towards the monitoring well. Of note, fractures that are detected by the DAS system 116 can be referred to hereinafter as observed fractures 134'. Fractures that are not detected by the DAS system 116 can be referred hereinafter as unobserved fractures 134". As can be appreciated, since a distance between the treatment well 110 and the monitoring well 112 can be easily determined, a length of observed fractures 134' can be at least equal to a distance between the two. As was previously described, a total length of the observed fractures 134' can be estimated to include a distance past the monitoring well 112. Further, a length of the unobserved fractures 134" can be determined from a statistical model and data from the DAS system 116.

Figure 2:
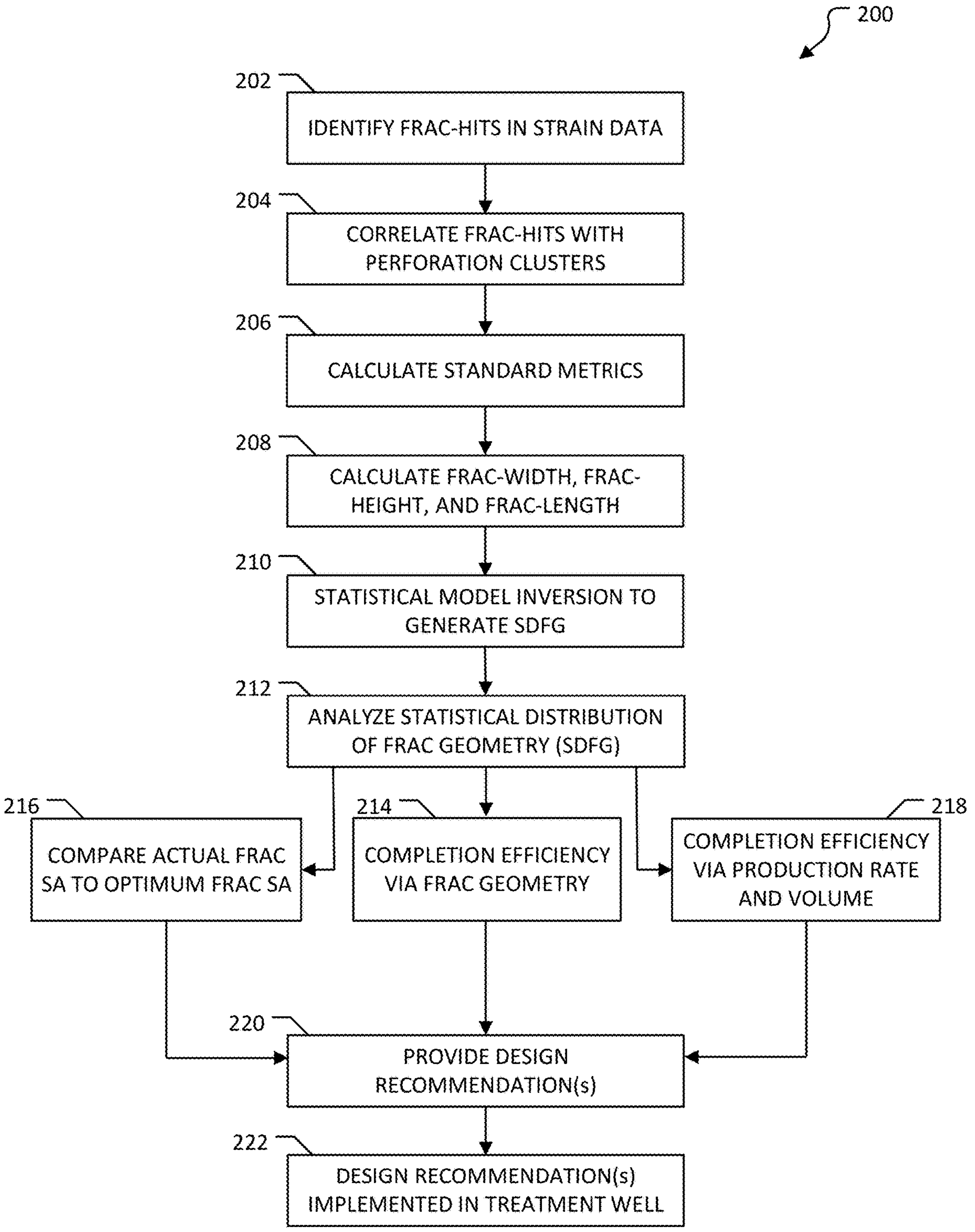
FIG. 2 is a flow diagram of a method for generating a completion design plan according to one embodiment of the present invention.

Referring to FIG. 2, a flow diagram of one example method (or process) 200 of generating a completion design plan including one or more design recommendations for a future treatment well is illustrated. Of note, several steps of the method 200 can be repeated for each stage of the treatment well 110. Once each stage has been completed and analyzed, the method 200 can generate the completion design plan.

In some instances, the method 200 can be implemented in near real-time while a treatment well is being treated. For instance, the DAS system 116 can be implemented to monitor a treatment well currently being treated. After each stage of the treatment well has been completed, data related to the completed stage can be provided to the control module 102. In most instances, the data can be analyzed to determine strain along a length of a fiber optic cable to generate distributed strain data prior to the data being sent to the control module 102. The control module 102 can be configured to analyze the distributed strain data from the DAS system 116. In some embodiments, the control module 102 may be configured to analyze data directly from the DAS system 116 to determine strain along a length of the fiber optic cable and generate the distributed strain data. Of note, the completion design plan may be continuously updated and may allow for a currently treated well to be optimized based on one or more previously completed stages.

Embodiments are contemplated where the completion design plan may not be generated until a treatment well is completed. In such an embodiment, the completion design plan may be implemented for a future treatment well. Once the distributed strain data from the completed treatment well is generated, the data can be sent to the control module 102. The method 200 can be implemented to analyze each stage of the completed treatment well. As can be appreciated, the data for each stage of the completed treatment well may be analyzed to help determine a completion design plan to be implemented for a future well. Each stage of the completed treatment well can be analyzed via the method 200 and can be used to generate the completion design plan.

In block 202, fracture hits (or frac-hits) can be identified in the analyzed strain data received from the monitoring well 112. The analyzed strain data can include distributed strain data created by the DAS system 116.

In block 204, identified frac-hits can be correlated with perforation clusters from each stage of the treatment well 110. Of note, each perforation cluster can be assumed to intend to create a fracture. Intended fractures detected at the monitoring well (i.e., frac-hits) can be categorized as an observed fracture. Intended fractures that are not detected at the monitoring well 112 can be categorized as an unobserved fracture. As such, each intended fracture (correlated to the number of perforation clusters in a stage) can be categorized as either being observed or unobserved.

In block 206, standard metrics related to the strain data can be calculated. The standard metrics can be implemented as inputs to help calculate fracture width, fracture height, and fracture length. As previously mentioned, standard metrics can include, but are not limited to, propagation velocity, treatment volume to frac-hit, frac efficiency, and frac azimuth.

In block 208, a fracture width (or frac-width), a fracture height (or frac-height), and fracture length (or frac-length) can be calculated via an inversion algorithm or estimated by other methods for each frac-hit (or observed fracture). Each calculated fracture dimension can be associated with a stage where the fracture was created in the treatment well 110. Of note, the calculated dimensions can help define a fracture geometry for each observed fracture. Observed fractures that reach the monitoring well can have at least a length as long as a distance between the treatment well and monitoring well. However, the observed fractures can continue to grow beyond the monitoring well. To estimate how long these fractures actually are, various methods can be implemented. Primary inputs for the inversion algorithm can include, but are not limited to, the measured distributed strain data including time and location information of the identified frac-hits.

In block 210, a statistical inversion process can be implemented to generate a statistical distribution of fracture geometry. Of note, unknown fracture geometries of the unobserved fractures can be estimated by integrating observed data with probabilistic models. The statistical inversion process can be implemented to estimate a fracture geometry of unobserved fractures and potentially refine or more accurately define a geometry of observed fractures. In one instance, inputs for the statistical inversion can include, but is not limited to, calculated fracture widths, calculated fracture heights, calculated fracture lengths, injection parameters (e.g., fluid volume), standard metrics (e.g., propagation velocity), and one or more statistical models. Of note, a fracture geometry of unobserved fractures can be estimated in this step. Of significant note, this can allow the method 200 to incorporate every intended fracture and a calculated or estimated geometry of every intended fracture.

As can be appreciated, this can allow for a more robust and accurate analyzation of a treatment well.

In block 212, the statistical distribution of fracture geometry previously generated can be analyzed for each stage of the treatment well. Utilizing the distribution, a "maximum likelihood" estimate can be determined. The maximum likelihood can represent a most probable fracture geometry based on one or more inputs (e.g., data and statistical model) for each intended fracture. The estimate can provide crucial information for subsequent modeling and decision-making. In one instance, one or more Monte Carlo methods can be implemented to determine the maximum likelihood for fracture geometry along with associated uncertainty. The Monte Carlo method(s) can help generate a "sample" of the distribution (generally many times), identifying fracture geometries that align with the observed data, and estimating geometries of fractures that may not be well constrained (e.g., fractures that do not reach the monitoring well). The one or more Monte Carlo methods can be applied across all stages and perforation clusters, resulting in a statistical representation of fracture geometries across the entire well. In one instance, the method can assume that all fractures are considered to have the same shape (e.g., rectangular, elliptical, etc.), ensuring consistency across the representation. Uncertainty of fracture length estimates can be determined by the one or more Monte Carlo methods.

In block 214, one or more metrics can be calculated for each stage of the treatment well based on the calculated fracture geometries of the statistical distribution of fracture geometries. In one instance, each of the stages can be grouped based on the design type implemented for the stage. The one or more metrics can serve as a quantitative indicator of fracture performance for each stage. Of note, by grouping stages according to their design types, an efficiency metric can be calculated and compared across different design types of the treatment of stages, enabling a design efficiency comparison. In one instance, an output can be an efficiency metric that provides a quantifiable basis for assessing and optimizing future completion designs.

In block 216, a ratio of actual frac surface area to optimum frac surface area may be implemented to create a fracture surface area metric (or parameter). The fracture surface area metric can be a ratio between an actual frac surface area and an optimum frac surface area. More specifically, a ratio can be calculated of actual frac surface area to optimum frac surface area to generate a percentage value that can be used for design optimization decisions in the completion design plan. The optimum frac surface area can (i) assume a fracture shape (e.g., elliptical, rectangular, etc.), (ii) estimate a fracture geometry (e.g., width, length, height) from observed data, and (iii) assume that all clusters at the treatment well initiate a fracture that grows within the estimated fracture geometry. The fracture geometry parameters can be constrained by treatment fluid volume. The fracture geometry parameters can include, but are not limited to, fracture width, length, height, and shape. An optimum frac surface area can then be calculated using these parameters. The actual frac surface area can assume a fracture shape generally similar to the assumed fracture shape of the optimum frac surface area. The most probable fracture geometry parameters from the statistical distribution of frac geometry (e.g., maximum likelihood) can be calculated. Then, the actual fracture surface area can be determined based on using these calculated parameters.

In block 218, a comparison of an actual production rate to an optimum production rate can be implemented as a metric (or parameter). For instance, a metric can be calculated that evaluates a difference in predicted production rates derived from optimum fracture geometries versus actual fracture geometries to measure completion efficiency. In one instance, an estimate can be implemented from the data (e.g., observed fractures) and injection parameters (e.g., injection volume) to predict production rates based on an optimum fracture geometry. Production rates can then be calculated using the actual fracture geometry derived from the statistical distribution of frac geometry and Monte Carlo sampling results. In one instance, the maximum likelihood can be used to define the actual fracture geometry. A production rate prediction model can be implemented that may utilize fracture geometry as a key input that may be either analytical or numerical. The production rate prediction model can be used to assess how fracture dimensions influence production outcomes. In one instance, a predicted production rate based on the optimum fracture geometry can be calculated. A predicted production rate using the actual fracture geometry may then be calculated. A difference between the optimum and actual predicted production rates can be implemented as a metric for assessing the performance of a completion design.

In block 220, a completion design plan (or recommendation) can be provided to a user. The completion design plan can include, but is not limited to, recommendations for cluster spacing, perforation design, stage length, proppant concentration, proppant size, fracking fluid volume, and well spacing. Of note, each of the metrics described can be implemented to present an efficiency of each design type. Additionally, the plan recommendation can incorporate an economic metric through production estimation, offering insights into the cost-effectiveness of each design. The completion design plan can implement all of the data from the monitoring well 112 for each stage to determine which stages were most effective and efficient. It is to be appreciated that the completion design plan may consider a preference of a user when finalizing the completion design plan. For instance, a user may prefer cost saving over efficiency.

In block 222, a user can implement one or more of the design recommendations in a treatment well currently being treated.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

We claim:

1. A method to evaluate every intended fracture created in a multi-stage, multi-cluster hydraulic fracturing treatment well (TW) during fracturing treatments of the TW, the method comprising:

obtaining a calculated fracture geometry for each observed fracture, each of the calculated fracture geometries based on at least distributed strain data acquired at a monitoring well during fracturing treatments of the TW;

determining unobserved fractures in each stage of the TW based on the distributed strain data;

using the calculated fracture geometries, at least one statistical model, and one or more injection parameters as inputs for a statistical inversion algorithm;

generating a statistical distribution of fracture geometries including every intended fracture from the statistical inversion algorithm;

updating the statistical inversion algorithm from each successive stage of the TW to further refine the statistical distribution of fracture geometries to estimate a fracture geometry for each unobserved fracture;

generating at least one performance metric based on the statistical distribution of fracture geometries;

providing one or more hydraulic fracturing design recommendations in a completion design plan based on the at least one metric; and implementing at least one of the one or more hydraulic fracturing design recommendations in a future treatment well.

2. The method of claim 1, wherein the calculated fracture geometry includes (i) a frac-width, (ii) a frac-height, and (ii) an estimated frac-length for each observed fracture.

3. The method of claim 1, wherein the at least one metric is selected from the group consisting of (i) a first metric based on comparing an actual frac surface area to an optimum frac surface area, (ii) a second metric based on evaluating a difference in predicted production rates derived from optimum fracture geometries versus actual fracture geometries to measure completion efficiency, and (iii) a third metric based on completion efficiency via fracture geometry.

4. The method of claim 1, wherein the statistical model is selected from the group consisting of Bayesian inference and Monte Carlo method.

5. The method of claim 1, wherein the step of determining unobserved fractures is based on an absence of detectable strain responses in the distributed strain data.

6. The method of claim 5, wherein the absence of detectable strain responses is determined by comparing a number of clusters in each stage of the TW to a number of observed fractures identified from the distributed strain data with a difference between the two indicating the unobserved fractures.

7. The method of claim 1, wherein observed fractures have at least a length equal to a distance between the treatment well and the monitoring well.

8. The method of claim 1, wherein the estimated fracture geometries of the unobserved fractures include an estimated fracture length, an estimated fracture width, and an estimated fracture height.

9. The method of claim 8, wherein the statistical distribution of fracture geometries is further refined by each stage of the TW.

10. The method of claim 1, wherein the statistical distribution of fracture geometries is refined by (i) measured fractured widths, (ii) calculated fracture heights, (iii) injection parameters, and (iv) one or more standard metrics.

11. A method to evaluate every intended fracture created in a multi-stage, multi-cluster hydraulic fracturing treatment well (TW) during fracturing treatments of the TW, the method comprising:

obtaining a calculated fracture geometry for each observed fracture, each of the calculated fracture geometries based on at least distributed strain data acquired at a monitoring well during fracturing treatments of the TW;

determining unobserved fractures in each stage of the TW based on the distributed strain data, every intended fracture including observed fractures and unobserved fractures;

using (i) the calculated fracture geometries for each observed fracture, (ii) at least one statistical model, and (iii) one or more injection parameters as inputs for a statistical inversion algorithm;

generating a statistical distribution of fracture geometries including every observed fracture from the statistical inversion algorithm;

using the statistical inversion algorithm to further refine the statistical distribution of fracture geometries to estimate a fracture geometry for each unobserved fracture;

using the estimated fracture geometries for each unobserved fracture to further refine the statistical distribution of fracture geometries;

generating a first predicted production rate, the first predicted production rate based on an actual fracture geometry of every intended fracture;

generating a second predicted production rate, the second predicted production rate based on an optimum fracture geometry of every intended fracture;

generating a first performance metric based on (i) the first predicted production rate and (ii) the second predicted production rate;

providing one or more hydraulic fracturing design recommendations in a completion design plan based on the first performance metric; and implementing at least one of the one or more hydraulic fracturing design recommendations in a future treatment well.

12. The method of claim 11, wherein the actual fracture geometry is based on most probable fracture geometry parameters derived from the statistical distribution of fracture geometries.

13. The method of claim 11, wherein the optimum fracture geometry is based on an estimation from the observed data.

14. The method of claim 11, wherein the statistical inversion algorithm assigns every intended fracture a predetermined shape.

15. The method of claim 11, wherein the first performance metric is a difference between the first predicted production rate and the second predicted production rate.

16. A method to evaluate every intended fracture created in a multi-stage, multi-cluster hydraulic fracturing treatment well (TW) during fracturing treatments of the TW, the method comprising:

obtaining a calculated fracture geometry for each observed fracture, each of the calculated fracture geometries based on distributed strain data acquired at a monitoring well during fracturing treatments of the TW;

determining unobserved fractures in each stage of the TW based on the distributed strain data, every intended fracture including observed fractures and unobserved fractures;

using (i) the calculated fracture geometries for each observed fracture, (ii) at least one statistical model, and (iii) one or more injection parameters as inputs for a statistical inversion algorithm;

generating a statistical distribution of fracture geometries including every observed fracture from the statistical inversion algorithm;

using the statistical inversion algorithm to further refine the statistical distribution of fracture geometries to estimate a fracture geometry for each unobserved fracture;

using the estimated fracture geometries for each unobserved fracture to further refine the statistical distribution of fracture geometries;

determining an optimum fracture surface area based on (i) the observed data, (ii) each intended fracture having the same shape, (iii) all perforation clusters at the treatment well initiate a fracture, and (iv) being constrained by injection parameters;

determining an actual fracture surface area based on (i) most probable fracture geometry parameters derived from the statistical distribution of fracture geometries, and (ii) each intended fracture having the same shape as the optimum fracture geometry;

generating a first performance metric based on (i) the optimum fracture surface area and (ii) the actual fracture surface area;

providing one or more hydraulic fracturing design recommendations in a completion design plan based on the first performance metric; and implementing at least one of the one or more hydraulic fracturing design recommendations in a future treatment well.

17. The method of claim 16, further including the step of:

calculating a ratio of the actual fracture surface area to optimum fracture surface area.

18. The method of claim 16, wherein the actual fracture surface area is further based on a statistical inference of each intended fracture from the statistical distribution of fracture geometries.

19. The method of claim 18, wherein the statistical inference is a Monte Carlo sampling.

20. The method of claim 16, wherein a maximum likelihood estimation is determined for each intended fracture for fracture length, fracture width, and fracture height to determine the actual surface area.

21. A method to evaluate every intended fracture created in a multi-stage, multi-cluster hydraulic fracturing treatment well (TW) during fracturing treatments of the TW, the method comprising:

obtaining a calculated fracture geometry for each observed fracture, each of the calculated fracture geometries based on at least distributed strain data acquired at a monitoring well during fracturing treatments of the TW;

determining unobserved fractures in each stage of the TW based on the distributed strain data;

using the calculated fracture geometries, at least one statistical model, and one or more injection parameters as inputs for a statistical inversion algorithm;

generating a statistical distribution of fracture geometries including every intended fracture from the statistical inversion algorithm;

updating the statistical inversion algorithm from each successive stage of the TW to further refine the statistical distribution of fracture geometries to estimate a fracture geometry for each unobserved fracture;

determining a measurable metric for each stage of the TW;

grouping stages of the TW based on a design type of the stages;

comparing the efficiency metric for each different design type;

providing one or more hydraulic fracturing design recommendations in a completion design plan based on the comparison of the efficiency metrics; and implementing at least one of the one or more hydraulic fracturing design recommendations in a future treatment well.

22. The method of claim 21, wherein the metric is based in part on the observed fractures and the unobserved fractures.

23. The method of claim 21, wherein the metric is based in part on a geometry of the observed fractures and a geometry of the unobserved fractures.

24. The method of claim 23, wherein the metric is a uniformity index that quantifies how uniformly fracture volumes are distributed across all intended fractures in each stage.

25. The method of claim 24, wherein a higher index indicates more uniform fracture volumes.

* * * * *